June 24, 1930.  G. W. LANG  1,766,439
TRACTOR ATTACHMENT FOR CORN PICKERS
Filed March 5, 1928  4 Sheets-Sheet 1
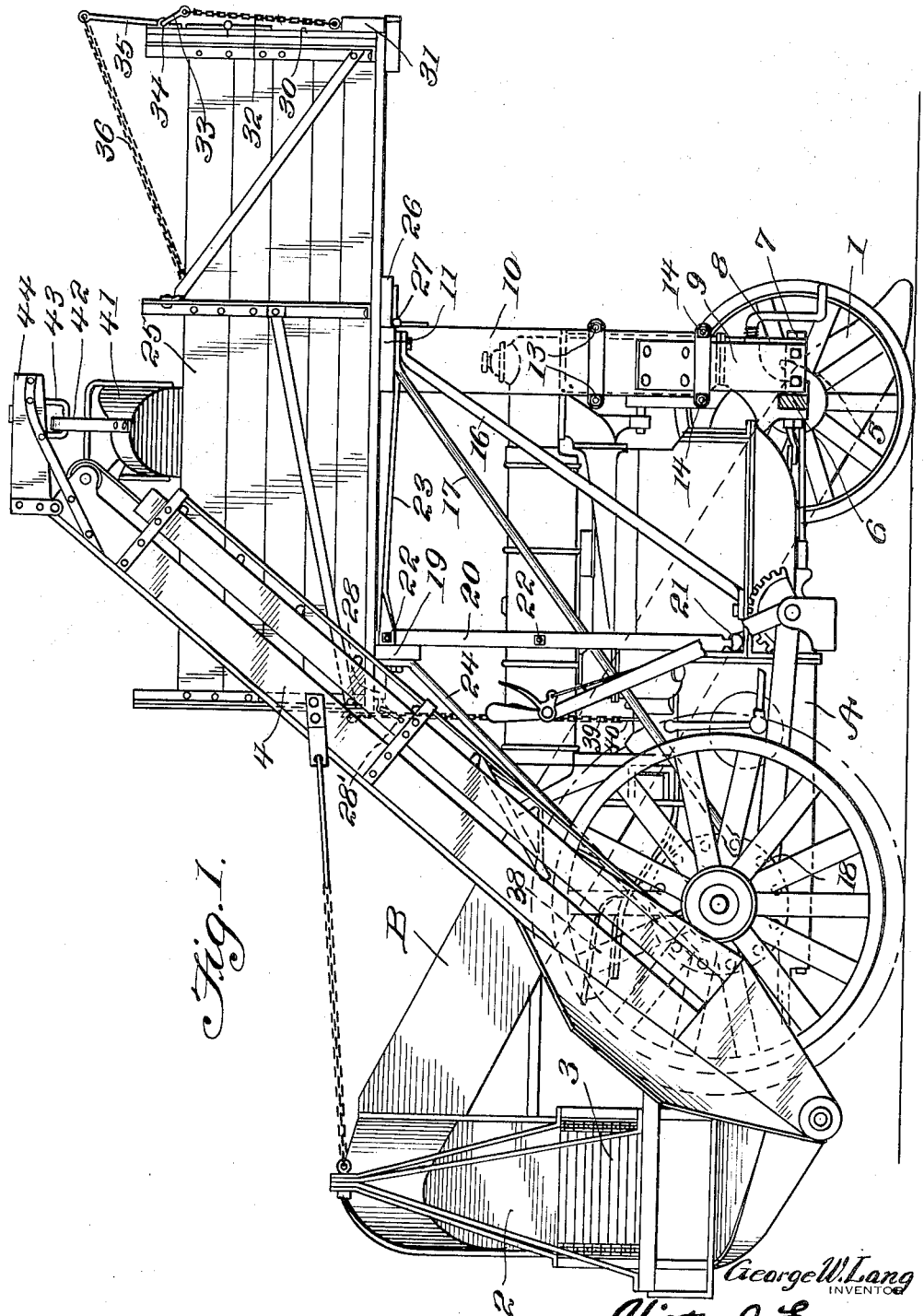

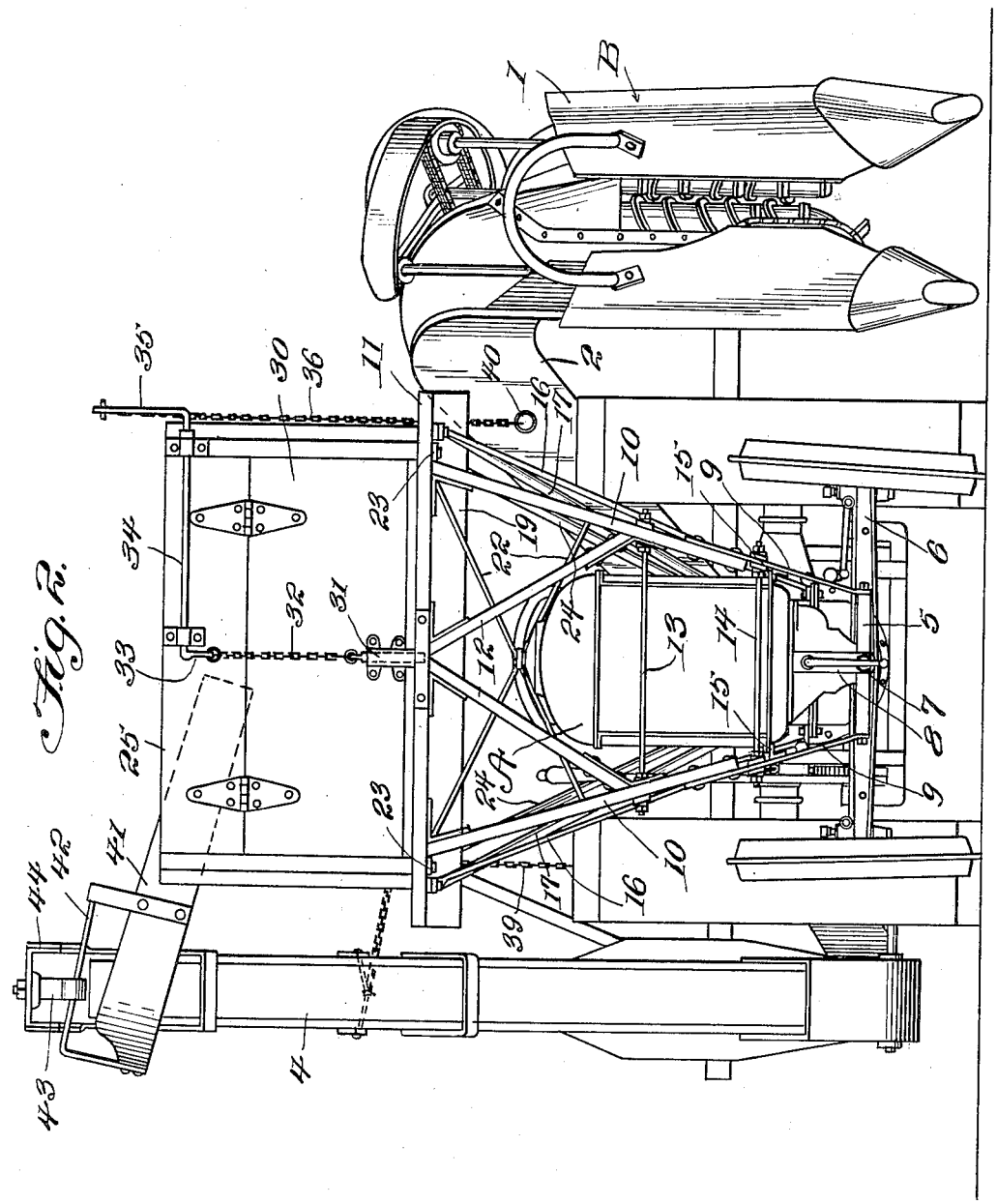

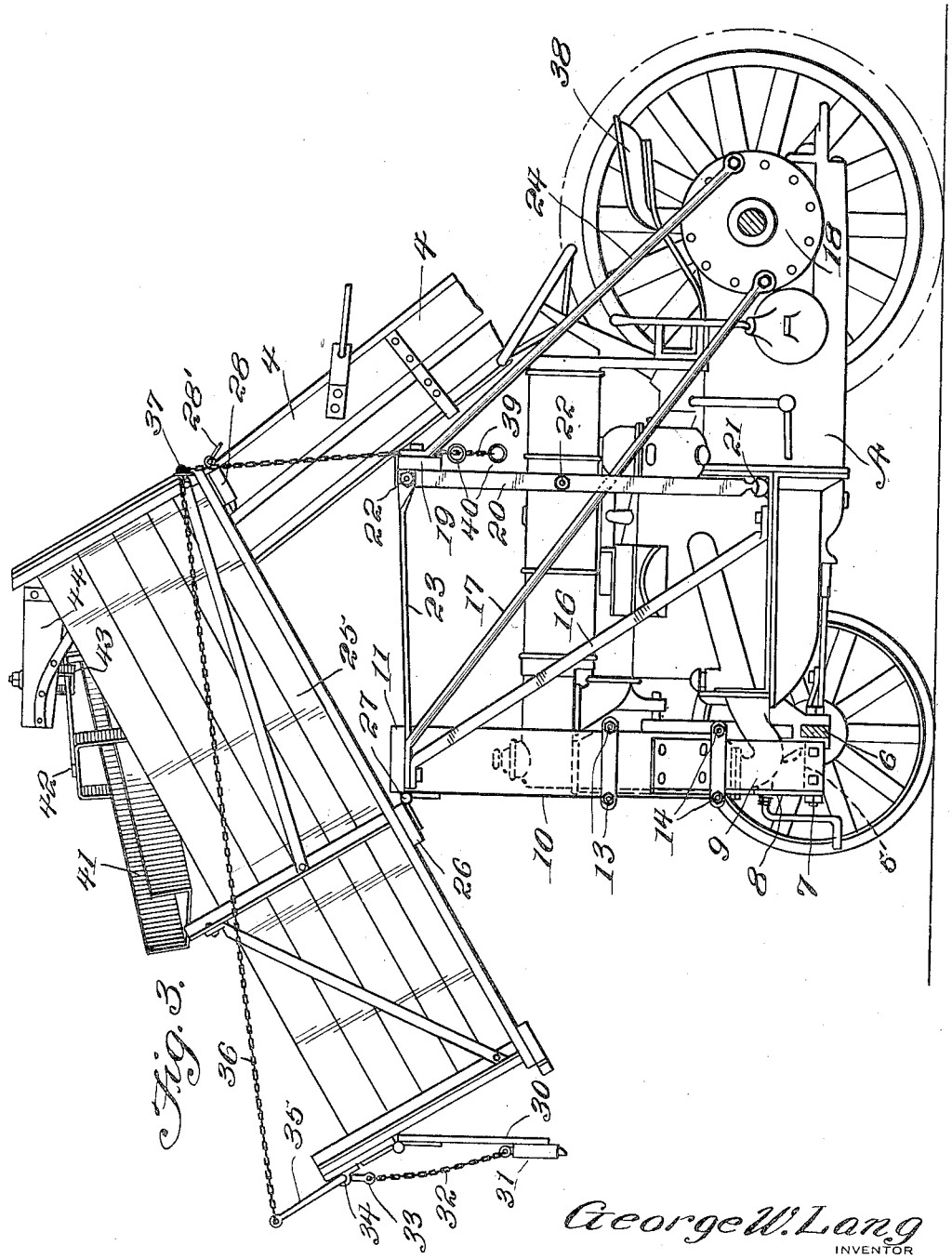

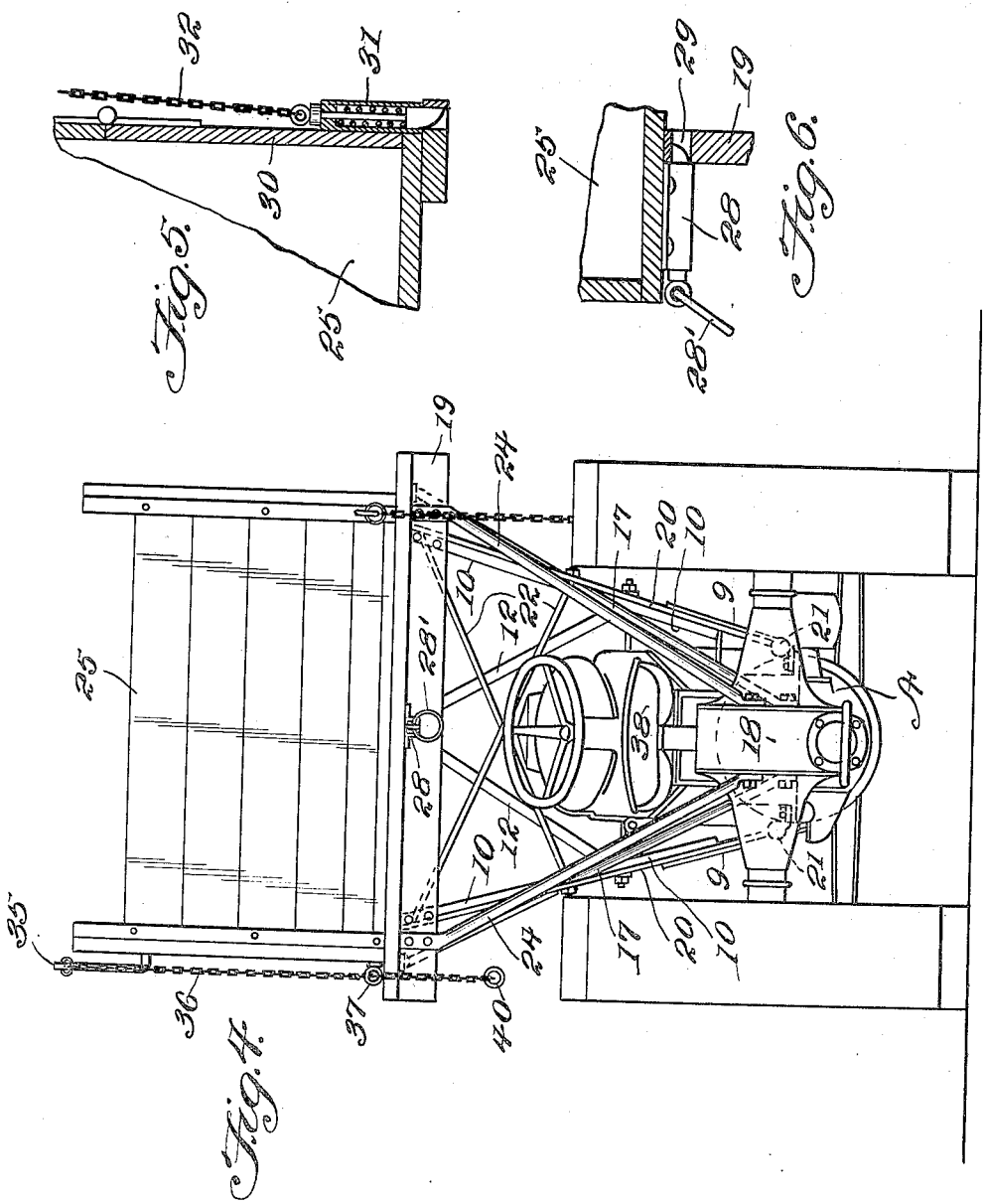

Patented June 24, 1930

1,766,439

UNITED STATES PATENT OFFICE

GEORGE W. LANG, OF LITCHFIELD, NEBRASKA

TRACTOR ATTACHMENT FOR CORN PICKERS

Application filed March 5, 1928. Serial No. 259,203.

This invention relates to an attachment for a tractor used in pulling a corn picker, the general object of the invention being to provide means for supporting a dump body or box on the tractor for receiving the corn from the picker so that the use of additional vehicles for receiving the corn from the picker is eliminated.

Another object of the invention is to provide means for unlatching the end gate of the box and dumping the same and returning the box to its normal position by the driver of the tractor without requiring him to leave his seat.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a tractor and picker, with the invention attached thereto.

Figure 2 is a front view of Figure 1.

Figure 3 is a view looking toward the opposite side from that shown in Figure 1, with parts of the picker omitted.

Figure 4 is a rear view with the picker omitted.

Figure 5 is a detail sectional view through the latch means for the end gate.

Figure 6 is a view of the latch means for holding the box in normal position.

In these drawings, A indicates a tractor and B indicates the corn picker which comprises the picker part 1 at one side of the tractor, the chute 2 which contains the husking means 3, at the rear of the tractor and the elevator 4 at the opposite side of the tractor, said elevator receiving the ears of corn from the chute. These parts are of well known construction and form no part of my invention.

In carrying out my invention, I fasten a bar 5 to the front face of the front axle 6 of the tractor by a bolt 7 which passes through the center of the axle and the center of the bar, the front end of the bolt being supported by a strip 8 which has a hole in its lower end to receive the front end of the bolt and its upper end is connected to the crank extension support of the tractor. A steel plate 9 is fastened at its lower end to each end of the bar 5 and these plates are divergently arranged, as shown in Figure 2. A wooden beam 10 is fastened to the end of each plate and the upper ends of these beams are fastened to a sill 11. Braces 12 connect the middle part of the sill with the beams 10 and a pair of tie rods 13 connect the beams together, one tie rod being in front of the radiator of the tractor and the other in the rear thereof. A similar pair of tie rods 14 connect the plates 9 together adjacent their upper ends. A bracket 15 is connected with each plate 9 and engages the under face of the flange on each side of the radiator. These lugs prevent the parts from tipping. A pair of braces 16 and 17 is arranged on each side of the tractor with their upper ends connected with each end of the sill 11 and the lower end of each brace 16 is connected to the motor at the point of junction of the crank case thereof with the base and each brace 17 is connected with the differential housing 18 of the tractor. Thus the parts at the front of the tractor are firmly supported.

The rear sill 19 is fastened to the upper end of the convergent bars 20 arranged one at each side of the tractor and the lower end of each bar 20 is connected with the side of the engine base by the ball and socket connection 21. The bars 20 are connected together by the tie rods 22. A bar 23 connects the upper end of each bar 20 with the front sill 11 and a brace 24 connects each end of the rear sill with the differential housing of the tractor. Thus I have provided an upright frame which is firmly connected with the tractor and which includes the front and rear sills 11 and 19 which extend across the tractor well above the same so that the driver of the tractor can have clear vision through the space between the sills and the top part of the tractor.

A body or box 25 has its intermediate bottom piece 26 connected with the front sill by the hinges 27, with the rear part of the bottom resting upon the rear sill 19. The front part of the body projects well in front of the tractor so that it can be dumped or tilted without interference on the part of the tractor. A latch 28 on the rear of the bottom of the box, engaging a keeper recess 29 in the rear sill, acts to hold the box against tilting movement. The front of the box is provided with a hinged door or gate 30 which is normally held in closed position by a latch 31. A chain 32 connects the latch with an arm 33 on a shaft 34 supported for rocking movement at the front end of the box with its outer end bent to form an arm 35. A cable 36 is connected with the upper end of the arm and passes rearwardly along one side of the box through an eye 37 on the rear end of the box and then extends downwardly to a point where it can be grasped by the operator of the tractor occupying the seat 38 thereof. This arrangement permits the driver to release the latch 31 without leaving his seat. He can also release the latch 28 by pulling upon the ring 28' thereon without leaving his seat to dump the box. If there is not sufficient corn in the front end of the box to tilt the box when the latch 28 is released, the driver can tilt it by pushing upwardly on the rear end thereof. He can return the box from a tilted position to its normal position by pulling upon the cable 39 which is connected with the rear part of the box. Both cables may be provided with the rings 40 to form handholds.

A chute 41 is provided for delivering the corn from the upper end of the elevator 4 into the box. This chute is provided with an elevated bar 42 which passes through the eye of a bolt 43 which is swiveled to an upright support 44 on the upper end of the elevator. This arrangement permits the box to be dumped and returned to its normal position without interference on the part of the chute as the chute will adjust itself in relation to the box as the box is moved.

From the foregoing it will be seen that the ears of corn lifted by the elevator 4 will be directed into the box by the chute 41 and then when the operator of the tractor wishes to dump the box, he will pull upon the cable 36 to release the latch 31 of the gate and then he will release the latch 28 so that the box will tilt and thus dump its load in front of the tractor. After the load is dumped, the driver will pull upon the cable 39 to lower the box and then both latches will automatically engage their keepers to lock the box in its normal position and to lock the gate in closed position.

With this invention, one man can pick the corn in a field, thereby eliminating extra help and additional teams and wagons for receiving the corn from the picker.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In combination with a tractor and corn picker including an elevator, an upright frame supported on the tractor and including horizontal sills arranged above the tractor, a box hingedly connected intermediate its ends to the front sill and having its rear portion normally resting upon the rear sill whereby the box can be dumped forwardly in front of the tractor, a latch for holding the box in normal position, an end gate at the front of the box and a chute for delivering the ears of corn from the elevator of the picker into the box.

2. In combination with a tractor and corn picker including an elevator, an upright frame supported on the tractor and including horizontal sills arranged above the tractor, a box hingedly connected intermediate its ends to the front sill and having its rear portion normally resting upon the rear sill whereby the box can be dumped forwardly in front of the tractor, a latch for holding the box in normal position, an end gate at the front of the box, a chute for delivering the ears of corn from the elevator of the picker into the box, a latch for holding the end gate closed and means for releasing the latch from a point adjacent the driver's seat of the tractor.

3. In combination with a tractor and corn picker attached to the tractor, said picker including an elevator, uprights attached to the front part of the tractor, uprights attached to the intermediate portion of the tractor, a front sill connected with the upper ends of the front uprights, a rear sill connected with the upper ends of the rear uprights, braces for the uprights, a box hingedly connected with the front sill intermediate its ends and having its rear part normally resting upon the rear sill, a latch for holding the box in its normal position, an end gate at the front of the box, latch means for holding the same closed, means for operating the last mentioned latch from a point adjacent the driver's seat, a cable connected with the rear of the box for enabling the driver to lower the box after the same has been tilted and a chute movably supported from the upper end of the elevator of the picker for conveying the corn from the elevator into the box.

In testimony whereof I affix my signature.

GEORGE W. LANG.